United States Patent [19]

Romie

[11] Patent Number: 4,905,432
[45] Date of Patent: Mar. 6, 1990

[54] WINDSHIELD GLASS AND TRIM ASSEMBLY AND METHOD FOR MAKING SAME

[75] Inventor: Norbert E. Romie, Fort Wayne, Ind.

[73] Assignee: Navistar International Transportation Corp., Chicago, Ill.

[21] Appl. No.: 163,683

[22] Filed: Mar. 3, 1988

[51] Int. Cl.⁴ ............................ E04B 3/00; E06B 3/54
[52] U.S. Cl. ........................................ 52/208; 52/400; 296/93; 296/201
[58] Field of Search ................... 52/208, 397–403; 296/29, 84 A, 84 D, 93, 146, 154, 194, 200, 201, 216, 218, 202

[56] References Cited

U.S. PATENT DOCUMENTS

| | | |
|---|---|---|
| 2,818,613 | 1/1958 | Peras . |
| 3,045,787 | 7/1962 | Attwood . |
| 3,583,757 | 6/1971 | Wilfert et al. . |
| 3,705,470 | 12/1972 | Kent . |
| 3,759,004 | 9/1973 | Kent . |
| 3,851,432 | 12/1974 | Griffin . |
| 3,866,374 | 2/1975 | Dallen ................................. 52/400 |
| 4,072,340 | 2/1978 | Morgan . |
| 4,139,234 | 2/1979 | Morgan . |
| 4,270,792 | 6/1981 | Mathieson et al. . |
| 4,292,774 | 10/1981 | Mairie . |
| 4,332,412 | 6/1982 | Nakazawa et al. . |
| 4,332,413 | 6/1982 | Erion . |
| 4,343,121 | 8/1982 | Kruschwitz et al. . |
| 4,349,994 | 9/1982 | Maekawa . |
| 4,358,917 | 11/1982 | Oda et al. . |
| 4,364,595 | 12/1982 | Morgan et al. . |
| 4,434,593 | 3/1984 | Horike et al. . |
| 4,436,337 | 3/1984 | Bowes et al. .................... 52/208 X |
| 4,488,753 | 12/1984 | Koike .............................. 52/208 X |
| 4,502,259 | 3/1985 | Smith . |
| 4,523,783 | 6/1985 | Yamada . |
| 4,568,119 | 2/1986 | Minami et al. . |
| 4,570,399 | 2/1986 | Wentink ........................... 52/208 |
| 4,635,420 | 1/1987 | Batky . |
| 4,813,733 | 3/1989 | Gustafson et al. ............ 52/400 X |

FOREIGN PATENT DOCUMENTS

| | | | |
|---|---|---|---|
| 2520428 | 7/1983 | France ............................. 52/208 |
| 1013322 | 12/1965 | United Kingdom ............ 52/208 |

Primary Examiner—Richard E. Chilcot, Jr.
Attorney, Agent, or Firm—F. David AuBuchon; Dennis K. Sullivan

[57] ABSTRACT

The trim strip is used for trimming a periphery of a windshield. The trim strip has, in cross section, a T shape including a cross member and a base member, the base member comprising a locating member. The locating member depends from the cross member and is adapted to engage onto a locating fixture.

The windshield glass and trim assembly comprises a windshield glass having a trim strip bonded along an edge thereof to form an assembly having predetermined dimensions.

The method for forming the assembly includes the steps of:

a. movably attaching a trim strip to an end edge of the windshield;
b. providing locating means on the trim strip;
c. providing a locating mixture, the dimensions of which relate to the size of the vehicle opening;
e. laying the windshield over the locating fixture;
f. adjusting the position of the trim strip on the windshield so that the locating means on the trim strip lock onto the locating fixture; and
g. bonding the trim strip to the periphery of the windshield to form an assembly having predetermined dimensions.

13 Claims, 1 Drawing Sheet

WINDSHIELD GLASS AND TRIM ASSEMBLY AND METHOD FOR MAKING SAME

BACKGROUND OF THE INVENTION

1. Field of the Invention

The present invention relates to a method for making a windshield glass and trim assembly and the assembly formed thereby.

2. Description of the Prior Art

Recent changes to the outside appearance of cars and trucks have been greatly influenced by aerodynamic requirements. With respect to such aerodynamic requirements, significant changes have taken place in the manner of mounting of windshield glass to a vehicle body.

The major change has been from gasket-type mounting of a windshield which yields a definite offset between the glass surface and the body surface, to the bonded glass mounting which provides a glass surface and body surface in nearly the same plane. In such bonded mounting, a small extruded vinyl trim strip is positioned within a channel between the glass and body panels and extends over the glass and body panels after the glass is adhesively bonded in place, to provide a finished appearance to the juncture. The adhesive layer used to retain the glass in place is also used to retain the trim strip in place.

Further, more recent advancements have introduced an encapsulated glass process. This process includes the molding of a plastic trim strip onto the periphery of the glass, using an injection molding process in which the glass is placed into the mold during the molding process. This method provides a single unit for installation with excellent dimensional tolerances along the perimeter of the assembly. This process may also include the provision of glass locating identification marks, mounting tabs, spacer blocks and exterior lip-type seals. Although this process is a definite advancement over the bonding method described above, the cost of the injection mold and related equipment is intolerable for less-than-high volume production. Further, this process presents an unfavorable situation for replacement windshields in that the replacement windshield must incorporate the molded perimeter.

As will be described in greater detail hereinafter, the windshield glass and trim assembly and method for making same of the present invention provides an alternative to the encapsulation method. The method of the present invention provides a bonded glass and trim assembly having a dimensionally controllable perimeter, thus providing a good, near-flush fit between the glass and the body surfaces. Also, as will be described hereinafter, the glass and trim assembly and method for making same of the present invention eliminate the need for use of an injection mold.

The assembly, as will be further described below, includes a trim strip which is a vinyl extrusion having a unique shape in cross section. Such unique shape provides an aerodynamic exterior appearance, a bonding surface for bonding the trim strip to the glass, if desired, and location identifiers which may be required for dimensional control. The assembly of the present invention can be removed by the conventional wire method and the provision of the glass and trim strip as individual parts provides ease in replacement of the windshield glass if such replacement becomes necessary.

Further, the assembly of the present invention allows for off-line bonding of the trim strip to the glass and becomes one of several off-line operations already being performed on the glass. The assembly also allows the perimeter of the assembly to be dimensionally controlled by use of a locating fixture during formation of the assembly. In addition, at installation, the adhesive used in bonding the glass to the body of the vehicle also provides for adherence of the trim strip of the assembly to the body surface.

SUMMARY OF THE INVENTION

According to the invention there is provided an elongate trim strip for trimming a periphery of a windshield, the trim strip having, in cross section, a T shape including a cross member and a base member, the base member of the T comprising a locating member, the locating member depending centrally from the cross member and being adapted to engage a locating fixture.

Further according to the invention there is provided a windshield glass and trim assembly comprising a windshield glass having a trim strip bonded around an end edge of the windshield glass, the trim strip being an elongate, unitary structure having, in cross section, a planar cross portion having a first end portion and a second end portion and a central depending portion, each end portion extending laterally outwardly from the central depending portion, the central depending portion forming a locating member for providing a windshield glass and trim assembly of predetermined size.

Still further according to the invention there is provided a method for forming a windshield glass and trim assembly for mounting in an opening of a vehicle including the steps of:

a. installing a trim strip around a periphery of the windshield;

b. providing locating means on the trim strip;

c. providing a locating fixture, the dimensions of which relate to the size of the vehicle opening;

d. laying the windshield with installed trim strip over the locating fixture;

f. adjusting the position of the trim strip around the periphery of the windshield so that the locating means on the trim strip lock onto the locating fixture; and g. bonding the trim strip to the periphery of the windshield once the locating means lock onto the locating fixture to form a windshield and trim assembly having predetermined dimensions.

DESCRIPTION OF THE PREFERRED EMBODIMENT

Figure 1:
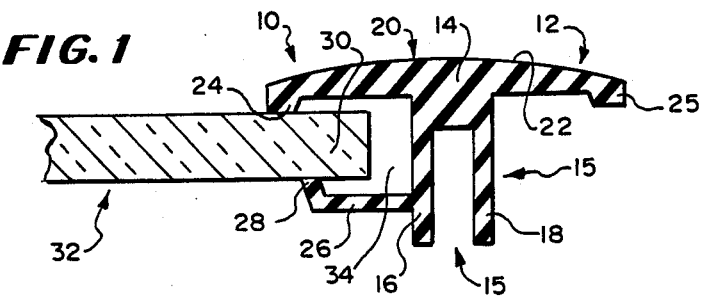
FIG. 1 is a cross sectional view through an end edge section of a windshield glass and trim assembly of the present invention and shows a trim strip mounted along an end edge of a glass windshield.

Referring now to the drawings in greater detail, there is shown in FIG. 1, in cross section, an end edge area of the windshield glass and trim assembly 10 of the present invention. The glass and trim assembly 10 includes an elongate, unitary trim strip 12 which has a unique cross sectional configuration.

The trim strip 12 is somewhat T shaped in cross section, having a horizontal cross member 20 forming the upper cross member 14 of the T and a base portion 15 which includes two depending spaced apart leg portions 16 and 18.

The horizontal cross member 20 has a slightly convex upper surface 22 having a downwardly projecting rib 24 at one end thereof and an identical downwardly projecting rib 25 at the other end thereof.

One of the leg portions, leg portion 16, has an arm 26 extending laterally away from it in a direction away from the other leg portion 18, and the arm 26 ends in an angularly upwardly flexed flange 28. The arm 26 is parallel to cross member 20 and the flange 28 is slightly inwardly positioned relative to the position of the rib 24 extending downwardly from the cross member 20, above the arm 26. Also, the arm 26 is vertically spaced a predetermined distance from the cross member 20, as will be defined further hereinafter.

As shown, the flange 28 and the downwardly projecting rib 24 of the cross member 20 extending downwardly thereabove, interact to grasp and hold an end edge portion 30 of a glass windshield 32 therebetween. The vertical spacing between the flange 28 and the rib 24 is approximately equal to the thickness of the glass windshield 32 to be received therebetween.

The end edge portion 30 of the glass windshield 32 extends inwardly of the rib 24 and flange 28 and terminates within a somewhat rectangular cavity 34 which is defined by the leg portion 16 on one side, the arm 26 along a bottom, a portion 36 of the cross member 20 which extends over the arm 26, along a top, and the rib 24 and flange 28 on the other side.

As shown, the cavity 34 is of a horizontal dimension which will tolerate variances in the dimensions of the glass windshield 32 from those expected.

In this respect, if the windshield 32 is of a greater dimension than that expected it will extend further into the cavity 34 and if the dimension is smaller than that expected, it will terminate only slightly within the cavity 34.

Figure 2:
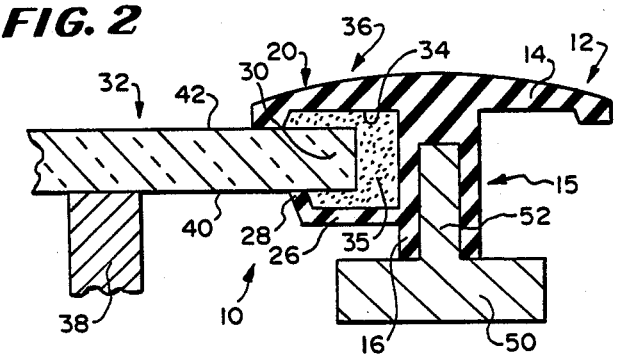
FIG. 2 is a cross sectional view similar to FIG. 1 and shows trim strip of the assembly positioned on a locating fixture used in practicing the method of the present invention.

The cavity 34, in addition to accommodating dimensional variations of the glass windshield 32, is used as an adhesive cavity 34 whereby, after appropriate positioning of the glass windshield 32 within the cavity 34, the cavity 34 is filled with a bead of adhesive 35 to bond the trim strip 12 to the windshield 32, forming the assembly 10 as illustrated in FIG. 2.

As shown, the windshield 32, in an off-line process, is placed upon a glass support structure 38 having a surface 40 of the windshield 32, which will form the interior surface 40 of the windshield 32 when it is mounted to a vehicle, resting upon the glass support structure 38. Another surface 42 of the windshield 32, which will form the exterior surface 42 of the windshield 32 when the windshield 32 is mounted to a vehicle, faces upwardly.

The trim strip 12 is then placed around the periphery or end edge 30 of the windshield 32 in the manner shown and so that the cross member 20 of the strip 12 is positioned over the surface 42 of the windshield 32 and so that the flange 28 of the arm 26 rests against the surface 40 of the windshield 32.

The dimensions of the opening in the vehicle within which the windshield 32 and attached strip 12 is to be mounted are then noted, as will be described in connection with the description of FIG. 3, and a particular locating fixture 50, which is a manufacturing tooling piece comprising a frame-type structure having predetermined dimensions, is positioned around and below the periphery 30 of the windshield 32.

The locating fixture 50 has, as shown, an inverted T shaped cross section, an upwardly extending leg portion 52 of which is sized to be received between the leg portions 16 and 18 of the trim strip 12. Once the locating fixture 50 has been positioned around the periphery of the windshield 32 and the end edge 30 of the windshield 32 has been placed within the cavity 34 of the trim strip 12, the trim strip 12 is then mounted over the leg portion 52 of the locating fixture 50 so that the leg portions 16 and 18 of the trim strip 12 straddle the leg portion 52 of the locating fixture 50. Use of a particular locating fixture 50 having predetermined dimensions which relate to the dimensions of a particular size windshield receiving opening for positioning of the trim strip 12 assures that the trim strip 12 will bridge the channel 53 (FIGS. 3 and 4) between the windshield 32 and the body panels 54 (FIGS. 3 and 4) of the vehicle to surround the windshield 32. It will be obvious that the position of the trim strip 12 relative to the end edge 30 of the windshield 32 may be shifted to accommodate any variance in the expected size of the windshield 32 or, as in aftermarket production of such an assembly 10, in the expected size of the opening within which the windshield 32 is to be received.

This is when the configuration of the cavity 34 comes into play, providing a tolerance for small variations in the dimensions of the windshield 32 relative to the dimensions of the opening in the vehicle.

In this respect, if the dimensions of the windshield 32 are smaller than those expected for a particular windshield opening, within a small variable, the windshield 32 will extend slightly inwardly of the flange 28 of the arm 26 and a little way into the cavity 34. On the other hand, if the dimensions of the windshield 32 are greater than those expected, relative to the dimensions of the windshield opening, within a small variable, the windshield 32 can extend further into the cavity 34, up to a position where the end edge 30 of the windshield 32 rests against the leg portion 16 of the trim strip 12.

Once the trim strip 12 is appropriately positioned around the windshield 32 by use of the locating fixture 50, it is fixed to the windshield 32 by placement of the adhesive 35, such as the adhesive used to bond the windshield 32 to the vehicle, within the cavity 34. When the bonding of the trim strip 12 to the windshield 32 is complete, the assembly 10 of bonded windshield 32 and trim strip 12 is removed from engagement over the locating fixture 50 and is ready for mounting, as shown in FIG. 3.

Figure 3:
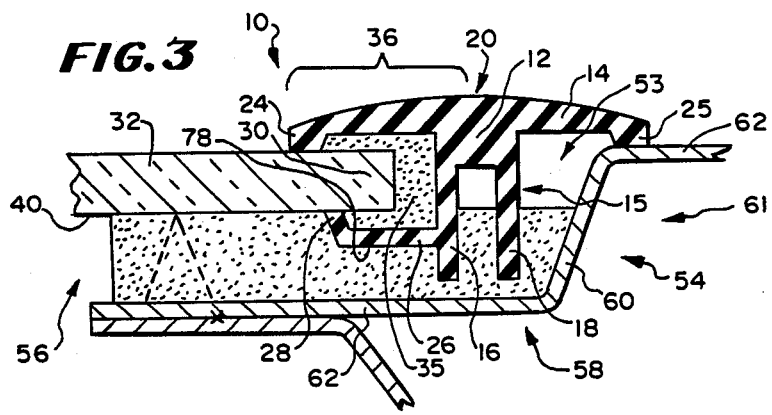
FIG. 3 is a cross sectional view similar to FIG. 1 and shows the assembly of the present invention fixed to one embodiment of a body panel of a vehicle.
Figure 4:
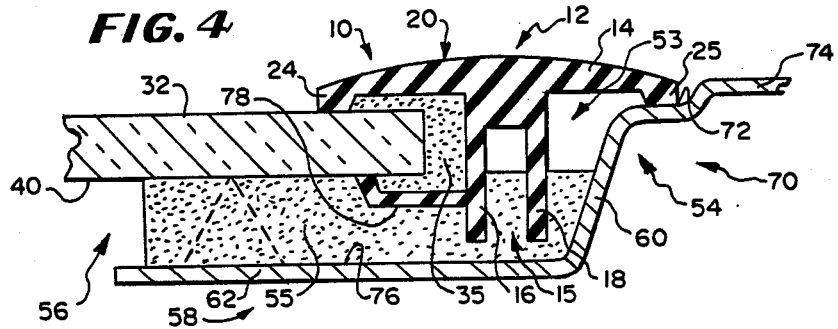
FIG. 4 is a cross sectional view similar to FIG. 3 and shows the assembly of the present invention fixed to another embodiment of a body panel of a vehicle.

In use of the locating fixture 50 for properly positioning the trim strip 12 relative to the end edges of the windshield 32, it is to be understood, as illustrated in FIGS. 3 and 4 that the various body panels 54 which surround an opening 56 in the vehicle for receiving the windshield 32 are provided with flanges 58 in a conventional manner.

As shown in FIG. 3, the flanged body panels 54 include an inwardly offset side wall 60 which extends generally normal to the glass windshield 32 and a flange 62 which extends into the opening 56 from the side wall 60 in a plane parallel to the plane of the windshield 32.

After the trim strip 12 has been movably engaged onto the end edge 30 of the windshield 32 by placement of the end edge 30 within the cavity 34 and positioned on the end edge 30 of the glass windshield 32, by use of a particular locating fixture 50, the dimensions of which relate to the size of the opening 56 within which the windshield 32 is to be fitted, it can be assured that the cross member 20 of the trim strip 12 will completely cover the channel 53 which exists between the end edge 30 of the windshield and the side wall 60 of the opening 56 when the assembly 10 is mounted within the opening 56.

In positioning of the trim strip 12 to cover the channel 53 between the end edge 30 of the windshield 32 and the side wall 60 of the opening 56, the particular locating fixture 50 chosen for use in forming the assembly 10 has the upwardly extending leg 52 thereof in a position which corresponds to a position along the flange 58 around which the leg portions 16 and 18 of the trim strip 12 are to be centered.

The trim strip 12 is then moved to either side, while remaining in contact with the windshield 32, to a position where the leg portions 16 and 18 thereof straddle the leg portion 52 of the locating fixture 50. Once the trim strip 12 has been engaged onto the leg 52 of the locating fixture 50 around the periphery 30 of the glass windshield 32, the cavity 34 is filled with adhesive 35 and the trim strip 12 is secured to the glass windshield 32, the trim strip 12 remaining mounted on the locating fixture 50 until the adhesive dries. The assembly 10 of trim strip 12 bonded to the windshield 32 is then removed from engagement with the locating fixture 50 and is ready for mounting onto the vehicle.

FIGS. 3 and 4 illustrate the method of mounting the assembly 10 of bonded windshield 32 and trim strip 12 to different embodiments of body panels 54 of a vehicle surrounding the opening 56 within which the assembly 10 is to be placed.

In FIG. 3, one embodiment 61 of a flanged body panel 54 is shown. In this embodiment 61, an exterior wall surface 62 of the body panel 54 is shown to be planar. In such an arrangement, as shown, the assembly 10 is mounted so that the windshield 32 thereof is almost flush with the exterior wall surface 62 of the body panel 54. It is to be understood also, that the cross member 20 of the trim strip 12 may be of varied length, to accommodate styling preferences.

An example of such a styling preference may be seen in FIG. 4, where the exterior wall surface 74 of this embodiment 70 of a body panel 54 provides for a recessed windshield 32 by the provision of a countersunk shoulder 72 in the exterior wall surface 74 around the opening 56 for the assembly 10.

In either embodiment 61, 70 of the body panels 54, once the windshield 32 is mounted to a vehicle as shown, the cross member 20 of the trim strip 12 will form a planar bridge over the channel 53 between the windshield 32 and the body panel 54 forming the opening 56 in the vehicle for receiving the windshield 32. Further, the strip 12 of the present invention, will provide a windshield 32 which is almost flush with the body panels 54 of the vehicle surrounding the opening 56 in which the windshield 32 is to be received.

Such nearly flush mounting of the windshield 32 in relation to the body panels 54 of the vehicle between which the windshield 32 is to rest provides a significant aerodynamic advantage to the assembly 10.

In mounting of the assembly 10 within the opening 56 surrounded by body panels 54 of the vehicle, regardless of the styling of the body panels 54, so long as the opening 56 is flanged and, obviously, slightly larger in dimension than the windshield 32, as shown in FIGS. 3 and 4, the mounting procedure is the same.

In this respect, in the mounting of the assembly 10 between and onto the body panels 54 of a vehicle, one first places small spacers, shown in phantom in FIGS. 3 and 4, at various locations around the flange 58, along a surface 76 of the flange 58 against which the assembly 10 will rest. Such spacers ensure that an adhesive 55 used in the mounting of the assembly 10 to the body panels 54 will be adequate in amount around the periphery 30 of the assembly 10 and will not be squeezed off the surface 76 of the flange 58 by the weight of the assembly 10.

Once the spacers have been positioned, with usually only one spacer being required along each side of the assembly 10, the adhesive 55 is applied onto either the flange 58 or the end edge portion 30 of the assembly 10 along the surface 40 of the windshield 32. The assembly 10 is then positioned within the opening 56, having been previously dimensioned with the locating fixture 50 as described above, so that the cross member 20 of the trim strip 12 spans the channel 53 between the end edge 30 of the windshield 32 and the exterior wall surface 62, 74 of the body panels 54. The rib 25 forms a cushion 25 for the end of the cross member 20 and rests against the exterior wall surface 62, 74 of the body panel 54. The leg portions 16 and 18 of the trim strip 12 become embedded, to a certain degree within the adhesive 55, as does a bottom surface 78 of the arm 26 and a portion of the glass windshield 32 just interior to the end edge 30. The embedding of such surfaces creates a greater surface area for bonding of the assembly 10 to the body panels 54.

The cross member 20 of the trim strip 12 is convex along the upper surface 22 thereof. Such convex shape has a twofold purpose. First, the convexity causes the ribs 24 and 25 at the ends of the member 20 to exhibit a tensioned force against any surface they bear against, here the windshield 32 and the body panel 54, and can be considered as "cushioning" the windshield 32 against jarring motion, the windshield 32 "floating" in the opening 56 since it does not bear against any hard surface. For this reason also, the leg portions 16 and 18 are of a length which is less than the depth of the side wall 60 of the body panel 54, keeping the leg portions 16 and 18 in a state of suspension above the flange 58.

Secondly, the trim strip 12 can be considered to be weather proofing, with rain or the like hitting the strip 12 rolling off the convex surface 22 and away from the channel 53 beneath the trim strip 12.

The assembly 10 of the present invention has a number of advantages, some of which have been described above, and other of which are inherent in the invention. Also, modifications can be made to the assembly 10 without departing from the teachings of the present invention. For example, the arm 26 extending laterally away from the leg 16 can be eliminated and the shape and styling of the cross member 20 may be varied from those shown. Accordingly, the scope of the invention is only to be limited as necessitated by the accompanying claims.

I claim:

1. A windshield glass and trim assembly comprising a windshield glass having a trim strip bonded around an end edge of and to the windshield glass, said trim strip being an elongate, unitary structure having, in cross section, a planar cross portion having a first end portion and a second end portion and a depending portion connected to said cross portion, each end portion extending laterally outwardly from said depending portion, said depending portion having a laterally outwardly projecting arm lying in a plane parallel to the plane of said cross portion and beneath said first end portion of said cross portion, said end edge of said windshield glass being received in nonabutting relation with said depending portion in an oversized cavity formed between said first end portion of said cross portion, said depending portion, and said outwardly projecting arm, and said cavity containing adhesive for bonding said trim strip to said glass.

2. The assembly of claim 1 wherein said depending portion of said trim strip comprises a locating member adapted to engage a locating fixture.

3. The assembly of claim 2 wherein said locating member comprises first and second spaced apart leg portions.

4. The assembly of claim 2 wherein said trim strip is bonded to said end edge of said windshield after said locating member is positioned on said locating fixture.

5. The invention of claim 2 wherein said locating member comprises two spaced apart leg portions.

6. The invention of claim 5 further in combination with a nonvehicular locating fixture wherein said leg portions are spaced apart a distance equal to a thickness of said locating fixture, said leg portions being disposed to be received over said locating fixture to position said trim strip relative to said end edge of said glass windshield received in said oversized cavity.

7. The invention of claim 6 wherein said locating fixture comprises a frame having predetermined dimensions relative to the dimensions of an opening in a vehicle body for receiving said glass windshield with trim strip therearound.

8. The invention of claim 1 wherein said cross portion is convex along a surface facing away from said arm.

9. A method for forming a windshield glass and trim assembly for mounting in an opening of a vehicle including the steps of:
 a. installing a trim strip around a periphery of the windshield by placing an end edge of the windshield within an oversized cavity provided in the trim strip for receiving the end edge of said windshield therein;
 b. providing locating means on said trim strip;
 d. providing a nonvehicular locating fixture, the dimensions of which relate to the size of the vehicle opening;
 e. laying the windshield with installed trim strip over said locating fixture;
 f. adjusting the position of the trim strip around the periphery of the windshield so that locating means on the trim strip lock onto said locating fixture; and
 g. bonding the trim strip to the periphery of the windshield once the locating means lock onto said locating fixture to form a windshield and trim assembly having predetermined dimensions.

10. The method according to claim 9 further comprising the steps of removing said trim strip and windshield assembly from said fixture and bonding said trim strip to said windshield opening of said vehicle.

11. A windshield glass and trim assembly comprising a windshield glass having a trim strip bonded around an end edge of and to the windshield glass, said trim strip being an elongate, unitary structure having, in cross section, a planar cross portion having first and second end portions and a depending portion, each end portion extending laterally outwardly from said depending portion, said end edge of said windshield glass being received under said first end portion and extending thereunder in nonabutting relation with said depending portion, said depending portion forming fixture engaging locating means adapted to be received over a locating fixture for position the trim strip relative to the end edge of said windshield glass, and adhesive disposed between said glass and said first end portion.

12. A method for forming a windshield glass and trim assembly for mounting in an opening of a vehicle including the steps of:
 a. installing a trim strip around a periphery of the windshield;
 b. providing locating means on said trim strip;
 d. providing a nonvehicular locating fixture, the dimensions of which relate to the size of the vehicle opening;
 e. laying the windshield with installed trim strip over said locating fixture;
 f. adjusting the position of the trim strip around the periphery of the windshield so that locating means on the trim strip lock onto said locating fixture; and
 g. bonding the trim strip to the periphery of the windshield once the locating means lock onto said locating fixture to form a windshield and trim assembly having predetermined dimensions.

13. The method according to claim 12 further comprising the steps of removing said trim strip and windshield assembly from said fixture and bonding said trim strip to said windshield opening of said vehicle.

* * * * *